A. L. STREETER.
BRAKE SHOE.
APPLICATION FILED JUNE 28, 1913.
1,090,892. Patented Mar. 24, 1914.
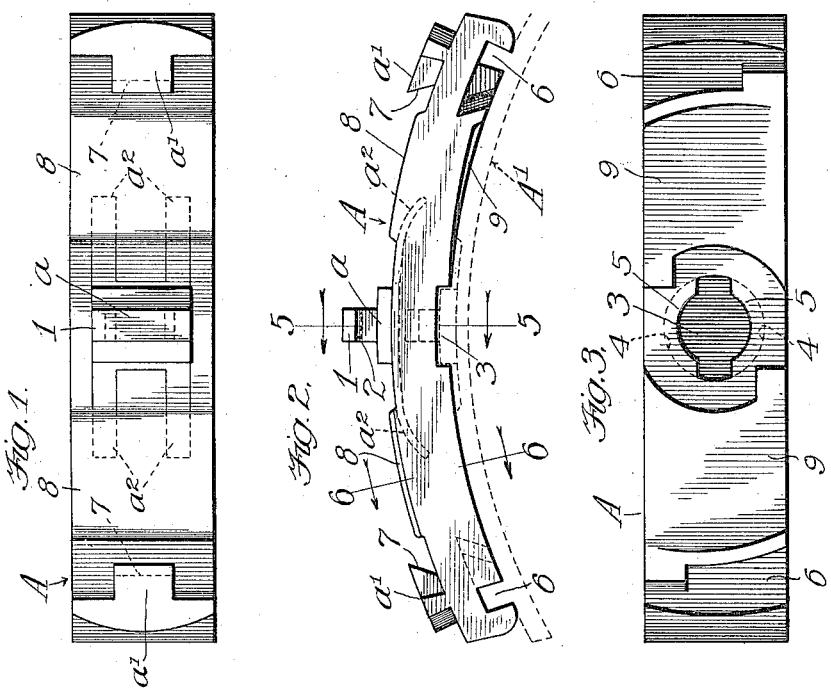
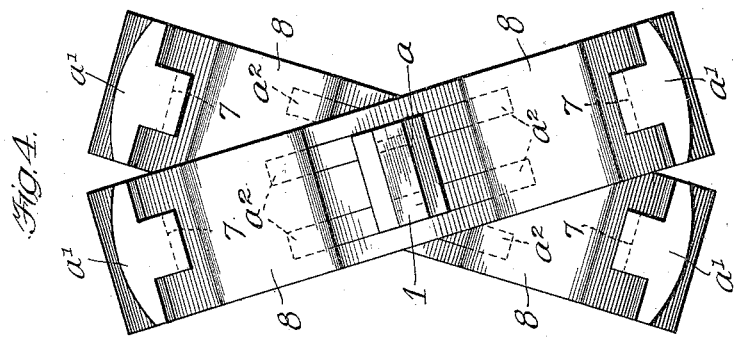
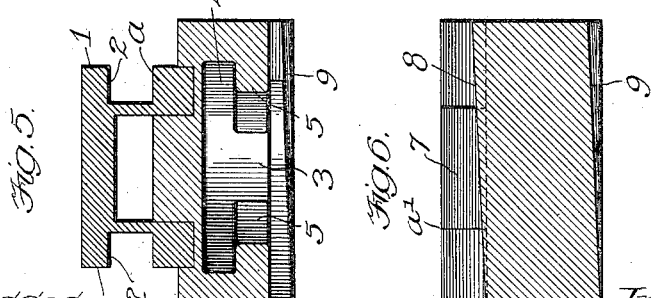
Witnesses
Martin H. Olsen.
Leo J. Dutrais.
Inventor
Alfred L. Streeter
By J.E. Waldo
Atty.

UNITED STATES PATENT OFFICE.

ALFRED L. STREETER, OF CHICAGO, ILLINOIS.

BRAKE-SHOE.

1,090,892.  Specification of Letters Patent.  Patented Mar. 24, 1914.

Application filed June 28, 1913. Serial No. 776,224.

*To all whom it may concern:*

Be it known that I, ALFRED L. STREETER, a citizen of the United States, and a resident of Chicago, in the county of Cook and State of Illinois, have invented a certain new and useful Improvement in Brake-Shoes, of which the following is a specification.

This invention relates to brake shoes.

The object of the invention is to provide a brake shoe construction whereby the brake shoes may be worn practically entirely out, and thus prevent the formation of all scrap from worn-out brake shoes. To effect this object, brake shoes of my invention are provided with interlocking parts on their backs and faces, the interlocking parts of different shoes coöperating to secure said shoes together and being constructed and arranged for engagement and disengagement by turning said shoes relatively to each other.

Specifically, the invention consists in providing each brake shoe with a lug on its back and a recess in its face, the recess of one shoe adapted to receive the lug on another, and interlocking parts on said lugs and within said recess constructed and arranged for engagement and disengagement by turning the shoes relatively to each other. In practice, said lug is formed by the usual attaching lug of the brake shoe, shoulders on which formed by lateral projections thereon are adapted to engage corresponding shoulders formed within the recess in the face of another shoe.

The invention also comprises various other features and details of construction hereinafter described and claimed.

In the accompanying drawing, in which my invention is fully illustrated Figure 1 is a back plan view of a brake shoe embodying my invention; Fig. 2 is a side view showing one of my improved brake shoes in full lines and a worn shoe in dotted lines secured to the face of said new shoe, as contemplated by my invention; Fig. 3 is a face plan view of a brake shoe of my invention; Fig. 4 is a back plan view of new and worn brake shoes of my invention, partially engaged with each other, as contemplated by my invention; and Figs. 5 and 6 are sectional views on the lines 5—5 and 6—6 of Fig. 2, respectively.

Referring now to the drawings, A designates the body portion of a brake shoe embodying my invention, and $a$ and $a^1$ the attaching lug and guide lugs, respectively, on the back of said shoe.

Formed on the attaching lug $a$, preferably at the lateral edges thereof, are projections 1, the under sides of which form shoulders 2, and formed in the face of the brake shoe is a recess 3, which is of substantially the same size and shape as the attaching lug $a$, including the projections 1 thereon, the center lines of said attaching lug $a$ and recess 3 extending at an angle to each other, said angle being preferably ninety degrees.

Formed within the recess 3, adjacent to its inner end are grooves 4, the outer sides 5 of which form shoulders and the relation being such that when the attaching lug $a$ of one shoe is inserted into the recess 3 of another shoe, the shoulders 2 on the projections 1 on said attaching lug may be interlocked with the shoulders 5 within said recess by turning said shoes relatively to each other, thus securing said shoes rigidly together.

In the practice of my invention, as a brake shoe becomes worn in use to a point where it would at the present time be scrapped, it is removed from the brake-head and is secured to the face of a new shoe by inserting the attaching lug of the worn shoe into the recess in the face of the new shoe, said shoes are then turned relatively to each other to interlock the projections on the attaching lug of the old shoe with the grooves within the recess of the new shoe. The manner of thus securing the worn shoe to the face of the new shoe is shown in Fig. 2 of the drawings, in which $A^1$ designates the worn shoe, the new shoe and the interlocking parts of said new and worn shoes being designated by the same reference characters as in the other figures of the drawing.

In addition to the means heretofore described for securing the shoes A, $A^1$ to each other, I also preferably provide means for locking the ends of said shoes together. In the preferable construction shown, said means consist of dovetail grooves 6 formed in the faces of said shoes which are adapted to receive and to interlock with the guide lugs $a^1$ of another shoe, for example, the worn shoe $A^1$, Fig. 2, the inner ends of said guide lugs $a^1$ being undercut, as shown at 7, the bevel thereof corresponding to the bevel of the dovetail grooves 6 with which said attaching lug engages. Pivotal movement of the sections of the shoes A, A¹ relatively to each other in the direction to effect engagement of the guide lugs a¹ with the grooves 6 is limited by means of suitable stops, formed, as shown, by the inner ends of said grooves 6, said grooves being of such length that when said shoes A, A¹ are turned into line with each other, the inner sides of the guide lugs a¹ will be in contact with the inner ends of said dovetail grooves 6.

The projections 1 on the attaching lug a and the grooves 4 within the recess 3 are preferably so positioned that when the shoes A, A¹ are engaged with each other, the back of the worn shoe A¹ will rest in contact with the face of the new shoe A. Preferably, also, means are provided for preventing turning of the worn shoe A¹ relatively to the shoe A, in use. While my invention contemplates the use of any desired or improved means for thus securing or locking said shoes from turning, I prefer to use what may be termed wedging surfaces which will be brought into strong frictional engagement with each other when the shoes A, A¹ are turned into line with each other. Specifically, said wedging surfaces are formed directly on the backs and faces of said shoes by sections 8 and 9 thereof, which are inclined at corresponding angles, the relation being such that the wedging surfaces 8 on the back of the worn shoe A¹ will engage the corresponding wedging surfaces 9 on the face of the new shoe A just before said shoes are brought into line with each other, and force, as a blow of a hammer, being required to bring said shoes A, A¹ into line against the resistance of the engaged wedging surfaces 8 and 9, whereby strong frictional resistance will be offered to turning of the worn shoe A¹. It will be understood, however, that said wedging surfaces may be formed on any two opposed surfaces when said shoes are turned to bring them into engagement with each other. Said wedging surfaces also form the stops which limit the pivotal movement of the shoes A, A¹ relatively to each other.

To insure against breaking of the attaching lug a and of the projections 1 thereon in use, said attaching lug is preferably made of malleable iron and is rigidly secured in the back of the shoe by means of integral projections a³ thereon, said projections being bent downwardly, as best shown in Fig. 2, so as to be securely embedded in the body portion of the shoe.

I claim:—

1. Brake shoes provided with interlocking parts on their backs and faces, the interlocking parts of different shoes coöperating to secure said shoes together and being constructed and arranged for engagement and disengagement by turning said shoes relatively to each other, substantially as described.

2. Brake shoes provided with interlocking parts on their backs and faces, the interlocking parts of different shoes coöperating to secure said shoes together and being constructed and arranged for engagement and disengagement by turning said shoes relatively to each other, said interlocking parts comprising such parts located adjacent to the ends of said shoes, substantially as described.

3. Brake shoes provided with interlocking parts on their backs and faces, the interlocking parts of different shoes coöperating to secure said shoes together and being constructed and arranged for engagement and disengagement by turning said shoes relatively to each other, said interlocking parts comprising dovetail grooves formed in the faces of said shoes, and the guide lugs on the backs thereof, the dovetail grooves in the face of one shoe being adapted to receive and interlock with the guide lugs on the back of another shoe, substantially as described.

4. Brake shoes, each provided with a lug on the back thereof and a recess in its face, the recess of one shoe adapted to receive the lug on another, and interlocking parts on said lugs and within said recess, constructed and arranged for engagement and disengagement by turning said shoes relatively to each other, substantially as described.

5. Brake shoes each provided with projections on the attaching lugs thereof, and a recess in its face provided with grooves adjacent to its inner end, the recess in one shoe adapted to receive the attaching lug on another, and the projections on said attaching lug being constructed and arranged for engagement and disengagement with the grooves within said recess by turning the shoes relatively to each other, substantially as described.

6. Brake shoes provided with interlocking parts on their backs and faces, the interlocking parts of different shoes coöperating to secure different shoes together and being constructed and arranged for engagement and disengagement by turning said shoes relatively to each other, and means to prevent turning of said shoes relatively to each other when fully engaged, substantially as described.

7. Brake shoes provided with interlocking parts on their backs and faces, the interlocking parts of different shoes coöperating to secure different shoes together, and being constructed and arranged for engagement and disengagement by turning said shoes relatively to each other, and means to prevent turning of said shoes relatively to each other when fully engaged, said means comprising wedging surfaces on the backs and faces of said shoes, substantially as described.

In testimony that I claim the foregoing as my invention, I affix my signature in the presence of two subscribing witnesses this 26th day of June, 1913.

ALFRED L. STREETER.

Witnesses:
MARY H. BIXEL,
MARTIN H. OLSEN.

Copies of this patent may be obtained for five cents each, by addressing the "Commissioner of Patents, Washington, D. C."